(12) United States Patent
Rainer

(10) Patent No.: US 9,278,869 B1
(45) Date of Patent: Mar. 8, 2016

(54) ASSEMBLY FOR TREATING FLOWING WATER

(71) Applicant: Norman B. Rainer, Richmond, VA (US)

(72) Inventor: Norman B. Rainer, Richmond, VA (US)

( * ) Notice: Subject to any disclaimer, the term of this patent is extended or adjusted under 35 U.S.C. 154(b) by 198 days.

(21) Appl. No.: 14/120,100

(22) Filed: Apr. 28, 2014

Related U.S. Application Data

(63) Continuation-in-part of application No. 13/987,796, filed on Sep. 4, 2013.

(51) Int. Cl.
| | | |
|---|---|---|
| *C02F 1/28* | (2006.01) | |
| *B01D 24/04* | (2006.01) | |
| *B01D 39/02* | (2006.01) | |
| B01D 39/04 | (2006.01) | |
| B01D 39/16 | (2006.01) | |
| B01D 24/00 | (2006.01) | |

(52) U.S. Cl.
CPC .............. *C02F 1/288* (2013.01); *B01D 24/002* (2013.01); *B01D 24/042* (2013.01); *B01D 39/04* (2013.01); *B01D 39/163* (2013.01); *B01D 39/1653* (2013.01); *C02F 2201/006* (2013.01)

(58) Field of Classification Search
CPC . C02F 1/288; C02F 2201/006; B01D 24/002; B01D 24/042; B01D 39/04; B01D 39/163; B01D 39/1653
USPC .............. 210/323.1, 342, 350, 484, 485, 489, 210/505
See application file for complete search history.

(56) References Cited

U.S. PATENT DOCUMENTS

| | | | | |
|---|---|---|---|---|
| 3,064,820 A * | 11/1962 | Gillick, Jr. | ......... | B01D 39/1623 210/484 |
| 3,280,984 A * | 10/1966 | Sexton | ................... | B01D 46/10 210/485 |
| 3,793,692 A * | 2/1974 | Tate | ....................... | B01D 46/10 210/484 |
| 5,468,536 A * | 11/1995 | Whitcomb | ......... | B01J 20/28014 210/242.1 |
| 7,381,333 B1 * | 6/2008 | Rainer | ..................... | C02F 1/286 210/660 |
| 7,501,380 B1 * | 3/2009 | Rainer | ..................... | B01J 20/26 428/402 |
| 8,263,229 B1 * | 9/2012 | Rainer | ................... | B01J 20/262 428/435 |
| 2009/0039028 A1 * | 2/2009 | Eaton | ................. | B01D 39/1623 210/679 |
| 2009/0078628 A1 * | 3/2009 | Stetson | ............... | B01D 29/012 210/167.1 |
| 2011/0024357 A1 * | 2/2011 | De Vocht | ............... | B01D 15/00 210/691 |
| 2011/0309036 A1 * | 12/2011 | Hussam | ................. | C02F 1/003 210/767 |

* cited by examiner

*Primary Examiner* — Matthew O Savage
(74) *Attorney, Agent, or Firm* — Norman B. Rainer

(57) ABSTRACT

A number of purifying packages containing layers of fibrous batting confining granules of substances which can remove toxic species from flowing water are arranged in an abutting planar array sandwiched between rigid grates.

12 Claims, 2 Drawing Sheets

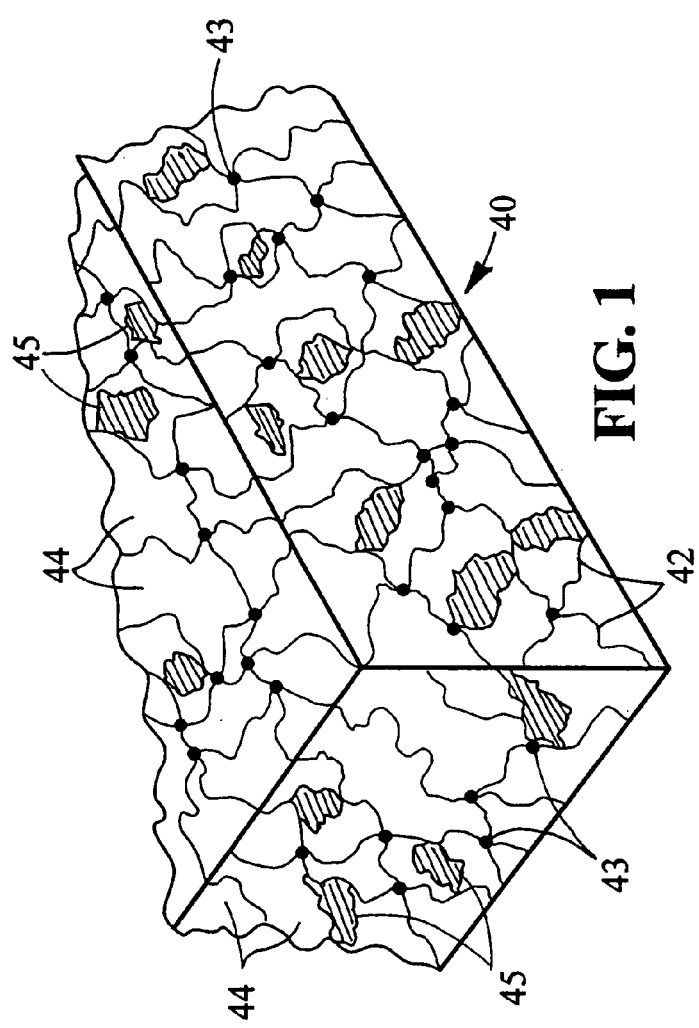
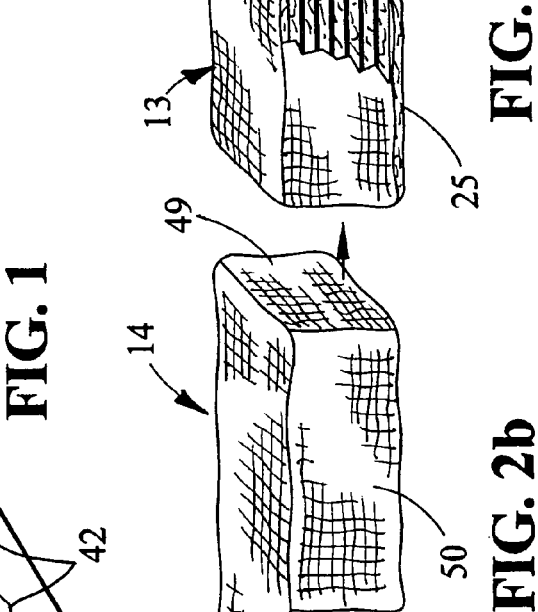
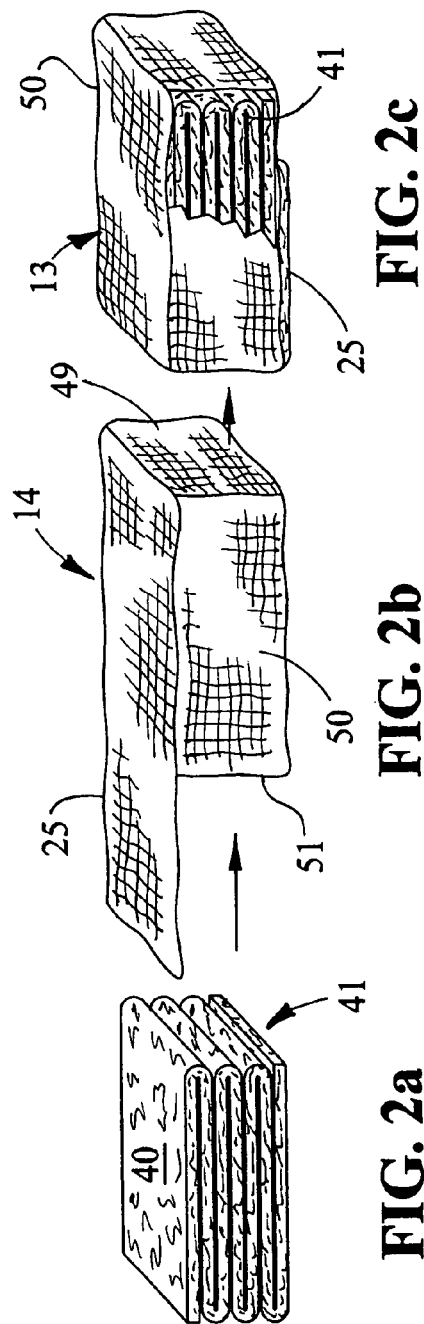
FIG. 1
FIG. 2a  FIG. 2b  FIG. 2c

ASSEMBLY FOR TREATING FLOWING WATER

RELATED APPLICATIONS

This application is a continuation-in-part of U.S. patent application Ser. No. 13/987,796, filed on Sep. 4, 2013 by the same inventor.

BACKGROUND OF THE INVENTION

1. Field of the Invention

This invention relates to water purification, and more particularly concerns apparatus and compositions for the selective removal of trace levels of dissolved species from rapidly flowing water.

2. Description of the Prior Art

Undesirable pollutant species such as dissolved organic compounds and toxic metals can occur regularly or periodically in natural bodies of water such as lakes, rivers, streams, groundwater and stormwater, and in industrial waters such as landfill leachate, municipal sewage systems and wastewater discharges. The toxic metals are primarily multivalent "heavy" metals, and can be caused to form insoluble compounds with anionic additives. The most prevalent technique for the removal of toxic heavy metals is to add to the water a sufficient amount of an anionic precipitating agent. The resultant precipitate is then allowed to settle or is removed by filtration or other methods.

Although precipitative techniques are effective, they require that the water undergoing remediation be accumulated in tanks and held there for considerable periods of time with agitation while the treatment agents are added and dispersed, causing the heavy metals to form precipitates of sufficiently large particle size to facilitate settling and/or filtration. Operations of this nature require large, expensive equipment installation and considerable operating expense. The high cost of such installations is justifiable only where extremely large volumes of water must be treated on a long term basis, such as in municipal waste water treatment facilities and operations involving large industrial facilities.

Another general technique for removing dissolved metal species from water involves the passage of a stream of the water undergoing remediation through a stationary bed of particulate absorbent material. Suitable absorbent materials for such "on-the-run" treatments include ion exchange resins in the form of spherical beads having sizes between about 10 and 20 mesh (U.S. Sieve Series). The advantage of such technique is that the water can be treated while flowing through a confined bed of the resins, thereby avoiding the need for large holding and processing tanks. However, such beds impose an impedance to the flow of water therethrough, necessitating pumping pressures of 10 to 30 psi to achieve reasonable flow.

Suitable absorbent materials must have the ability to selectively remove pollutant species at "trace" levels of 0.3 to 5 parts per million (ppm) amidst vastly greater concentrations of commonly abundant innocuous species. An exemplary particulate absorbent having adequate selective affinity for trace levels of heavy metal ions is polyamine/polyamide polymer disclosed in U.S. Pat. Nos. 3,715,339 and 7,041,222.

The removal of trace levels of organic species such as solvents, pesticides, herbicides and gasoline additives is generally achieved by pumping the afflicted water through a bed of granular activated carbon. As in the aforementioned case of employment of ion exchange materials, an "on-the-run" treatment cannot be done merely by using the impetus of a gravity flow of water.

The most prevalent need for water treatment at fast flow rates is in stormwater catch basins which receive a rapid, gravity induced flow of water, and treat the water with minimal flow impedance within a very confined space. Parent application Ser. No. 13/987,796 discloses a compact apparatus intended to be installed upstream of the effluent conduit leading away from a street-level stormwater receiving receptacle. It has now been found that there is significant need for related apparatus of much greater size to accommodate outflows from municipal and large industrial water treatment facilities.

It is accordingly an object of the present invention to provide means for selectively removing trace levels of dissolved species from fast gravity-induced flows of water.

It is a further object of the present invention to provide apparatus which will accommodate granular absorbent materials.

It is yet another object of this invention to provide apparatus of the aforesaid nature which is relatively unaffected by suspended matter within the water undergoing treatment.

It is a still further object of the present invention to provide apparatus of the aforesaid nature which is inexpensive to produce and maintain.

These objects and other objects and advantages of the invention will be apparent from the following description.

SUMMARY OF THE INVENTION

The above and other beneficial objects and advantages are accomplished in accordance with the present invention by a water filtration panel comprised of a number of purifying packages of substantially identical rectangular configuration assembled in side-by-side and top-to-bottom abutment in a planar array between paired rigid retaining grates which interactively form a cage that embraces said array in a sandwiching relationship which permits substantially unrestricted passage of water orthogonally through said array, said packages being comprised of several layers of compressible fibrous batting containing entrapped granules having affinity for dissolved species, said layers being snugly embraced by a fabric pouch.

In preferred embodiments, the grates are hingedly interconnected so as to facilitate placement and removal of the packages. When the grates are closed upon the array of packages, a cage is formed which compresses said packages by about 10% to 50% of their original thickness. The several layers of batting within said packages is preferably produced by an accordion-type folding of a single length of batting.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is an enlarged perspective schematic view of a batting containing entrapped granules.

FIG. 2a is a perspective side and top view of an accordion folded stack of batting of FIG. 1.

FIG. 2b is a perspective view of a fabric pouch in its open state.

FIG. 2c is a perspective view, partly in section, showing a stack of batting of FIG. 2a packaged within the pouch of FIG. 2b.

DESCRIPTION OF THE PREFERRED EMBODIMENT

Figure 4:
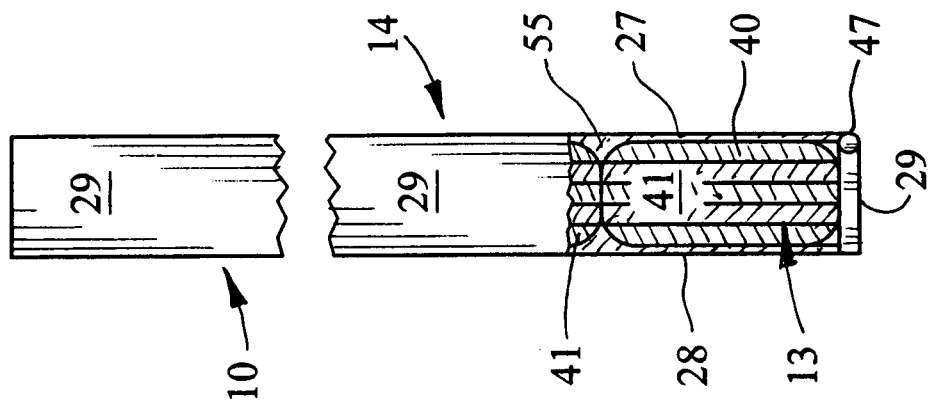
FIG. 4 is an enlarged side view of the filtration panel in its operational state with portions broken away and in sectional view.

Referring now to FIGS. 1, 2a, 2b and 2c, an embodiment of the purifying packages 13 employed in the present invention is shown comprised of a fibrous batting material 40 containing entrapped granules 45 capable of selectively absorbing or adsorbing dissolved species from water. Said batting material is preferably in the form of a strip of uniform width and thickness which is accordion-folded to form a stack 41. A pouch 14 envelopes said stack to form purifying package 13.

The batting materials are preferably selected from amongst those commonly available as padding layers for furniture. As best shown in FIG. 1, the batting is comprised of fibers 42 which are interbonded at contact sites 43 so as to form a shape-retaining structure having a network of communicating interstitial spaces 44. The manner of interconnection may involve controlled physical entanglement, as may be produced by needle-punching operations, or bonding agents that interact with the fibers at their intercontacting sites 43 without filling the spaces between the fibers.

For the purposes of the present invention, the fibers are preferably interconnected by bonding agents. The preferred fibers are synthetic fibers, particularly polyester, and the polyester fiber is preferably in a continuous form, as opposed to staple fiber lengths. The thickness of the batting is preferably between about ¼ inch and ¾ inch. Battings of such preferred characteristics will have a basis weight between about 3 and 8 ounces/square yard. Preferred batting materials for achieving the objectives of the present invention have a compressive modulus between 0.5 and 0.9 grams/square centimeter, said compressive modulus being defined as the amount of force required to produce a reversible 50% reduction in thickness of a layer of said batting.

Granules 45 of irregular shape are entrapped within the spaces 44. Said granules are incorporated into the batting preferably by forming an aqueous slurry of the granules, shuffling the batting within said slurry, and then lifting the batting vertically from the slurry. Such manner of forming the aforesaid granule-confining batting has been found superior to the method described in related U.S. Pat. No. 8,263,229 which suggests that the granules be generated in-situ. The generation of the granules in-situ has been found to be a costly operation. Also, it allows little control over the sizes of the particles, thereby producing treated battings having very fine sized granules that would not be retained by the batting.

The weight of granules (on a dry weight basis) thereby entered into the batting will range from about 0.6 to 2.0 times the weight of the batting. The granules, which may be activated carbon, zeolites, ion exchange polymers or other species, preferably have a particle size between 20 and 80 mesh (U.S. Sieve Series) Preferred ion exchange granules are capable of selectively absorbing heavy metal species from water, and contain a 50% to 70% water content when immersed in water. Suitable ion exchange granules may be produced from condensation-type polymers by methods described in U.S. Pat. No. 6,521,340 which is incorporated herein by reference. Preferred condensation polymers are produced by the thermal treatment of an aqueous solution of polyethyleneimine and nitrilotriacetic acid. Zeolites and activated carbon are capable of selectively adsorbing dissolved organic species.

The accordion-folded stack 41 is preferably comprised of 5 to 12 layers of batting. Said stack is inserted into pouch 14 having a closed bottom 49, parallel straight side extremities 50 and open top extremity 51. The pouch is preferably fabricated of continuous synthetic fiber in a woven or knitted construction capable of reversible stretching in the lateral direction between side extremities 50. The effective mesh size opening of the fabric is between about 80 and 100 (U.S. Sieve Series). Pouch 14 preferably has a flap 25 which closes top extremity 51 and folds onto the lower side of package 13.

Figure 3:
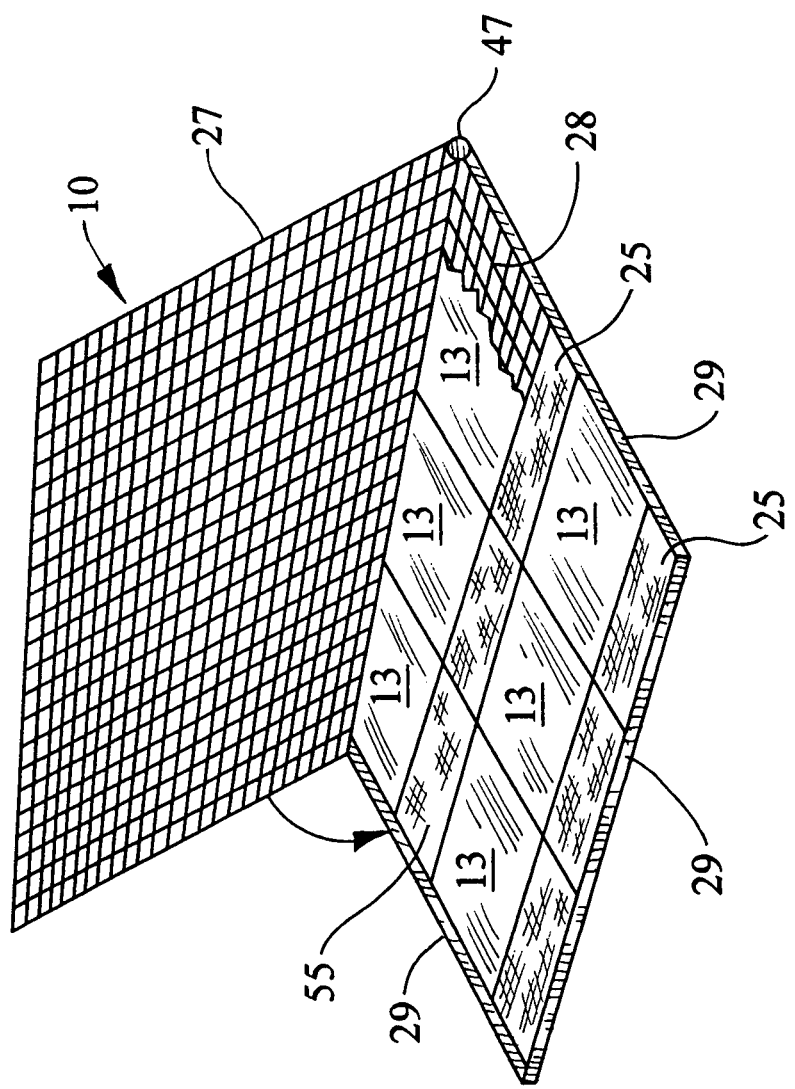
FIG. 3 is a perspective view of the water filtration panel of this invention in its open state.

FIGS. 3 and 4 show a filtration panel of the present invention employing flat first and second porous grates 27 and 28, respectively, of substantially matching four-sided rectangular perimeter and preferably pivotably interconnected along one side so as to move between an open state and a closed state which embraces purifying packages. Suitable grates may, for example, be woven wire mesh wherein the mesh openings are between ¼" and ⅝", and the wire diameters are 0.05" to 0.09". Such woven wire mesh material is available in stainless steel from the McNichols Company of Tampa, Fla. A non-porous sidewall apron structure comprised of four straight portions 29 of uniform height extends orthogonally upward from the perimeter of grate 28 to define, in said closed state, a cage 14 having an interior region 55 which can secure a number of packages. The function of the sidewall structure is to prevent any of the water that enters the cage from escaping before passing through the embraced layers. Second grate 28 in the illustrated embodiment is provided with pivot means 47 to enable movement between said open and closed states of the cage.

The thickness of cage 14 is defined by the distance between the grates in their parallel disposition, or the height of said sidewall portions. Said thickness is preferably 50% to 90% of the height of stacks 41, thereby enabling the cage to compress said packages between the planar top and bottom layers of each stack. Such compression, in the range of 10% to 50% is vital to the securement of the granules. The thickness of cage 14 is preferably between 1" and 3".

A further understanding of my invention will be had from a consideration of the following example which illustrates certain preferred embodiments. It is to be understood that the instant invention is not to be construed as being limited by said example or by the details therein.

Example 1

An aqueous solution is prepared containing equal parts by weight of polyethyleneimine (molecular weight 1800), and nitrilotriacetic acid. The solution is entered into a tray which is placed in an oven. Initially, the water evaporates, producing a rigid bubbled mass. Heating is maintained until the bubbled mass becomes rigid.

The tray is removed from the oven, and water is added. The bubbled mass disintegrates by way of decrepitation, forming a granular product. The granular product is wet sieved to obtain a fraction of 20×80 mesh (U.S. Sieve Series). When blotted dry, the granules contain 56% water. Microscopic examination of the granules reveals irregular jagged contours.

A piece of resin bonded polyester batting of ⅜" thickness is selected (Product X-45, Fairfield Processing Corp, Danbury, Conn.). A strip having a width of 8" and length of 60" is cut from the batting. The batting strip is immersed into a vigorously agitated aqueous dispersion containing the aforesaid 20×80 mesh granules, then vertically removed from the dispersion, causing an add-on of granules equal to 1.65 times the weight of the batting (dry weight basis). The strip is then formed into a seven layer accordion-folded stack of 8" square footprint. The stack is inserted into a close-fitting fabric pouch having lateral stretch characteristics and an 80 mesh porosity rating (Hancock Fabrics, lingerie fabric #602185), thereby forming a wrinkle-free purifying package.

A cage is provided having pivotably interactive upper and lower rectangular grates of rigid woven stainless steel having ½" openings (McNichols, Tampa, Fla.). Four sidewall portions surround the grates, forming an interior region with a lateral area of 24"×24" and a height of 1.25".

Six purifying packages are placed within the cage as shown in FIG. 3 in a manner such that the four sides of the packages are in abutment with contiguous packages or with side wall portions of the cage. The interactive grates compact the packages by 21%, thereby producing the filtration panel of the present invention. To test the resultant assembly for its ability to rapidly and selectively absorb trace levels of ionic metals at low impedance to flow, an aqueous outflow from a municipal water treatment facility containing 2 ppm (parts per million) $Cu^{++}$ and 200 ppm $Na^+$ was run by gravity flow at 5.1 psi (pounds per square inch) through the filtration panel at a temperature of 75° F. and a flow rate of 47 gallons/minute. It was found that, at a calculated contact time within the panel of only 3 seconds, 65% of the copper was removed.

After about 300 hours of continuous flow, the pressure at the upstream grate surface builds up to 5.9 psi of hydrostatic head. Said pressure build-up, indicative of increased impedance to flow through the filtration panel, is attributable to an accumulation of suspended particles from the incoming water. At this point, the filtration panel is reversed with respect to upstream/downstream positions, and placed back on line. The initially measured hydrostatic pressure at the upstream grate is now 5.3 psi. Such reduction in impedance is attributable to the flow-induced removal of accumulated sediment from the now downstream surface, and extends the useful life of the filtration panel.

In related trials, it is found that efficiencies of removal of dissolved ionic species range from 40% to 90%, depending upon contact times within the panel of 2 to 10 seconds, respectively. When the purifying packages contain granules such as activated carbon and zeolites, which remove organic species by an adsorption mechanism, contact times of 5 to 30 seconds are required to achieve removal efficiencies of 30% to 70%. Filtration panels having a large number of purifying packages may be employed, preferably in a rectangular array.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A water filtration panel comprised of a number of purifying packages of substantially identical rectangular configuration assembled in side-by-side and top-to-bottom abutment in a planar array between paired rigid retaining grates which interactively form a cage that embraces said array in a sandwiching relationship which permits substantially unrestricted passage of water orthogonally through said array, said packages being comprised of several layers of compressible fibrous batting containing granules having affinity for dissolved species, said layers being embraced by a fabric pouch.

2. The filtration panel of claim 1 wherein said grates have rectangular perimeters which match the configuration of the embraced array of packages.

3. The filtration panel of claim 2 wherein said grates are pivotably interactive to enable the grates to be brought together in opposing relationship.

4. The filtration panel of claim 2 wherein a substantially non-porous sidewall apron structure extends orthogonally from the perimeter of at least one of said grates.

5. The filtration panel of claim 1 wherein the embraced packages are compressed about 10% to 40% of their original thickness.

6. The filtration panel of claim 1 wherein the distance of separation of said grates in said cage is between about 1" and 4".

7. The filtration panel of claim 1 wherein said granules have an irregular, jagged shape.

8. The filtration panel of claim 1 wherein said granules have a size between about 20 and 80 mesh (U.S. Sieve Series).

9. The filtration panel of claim 1 wherein the weight of said granules represent about 0.6 to 2.0 times the weight of said batting.

10. The filtration panel of claim 1 wherein said packages contain 5 to 12 layers of said batting.

11. The filtration panel of claim 10 wherein said layers are formed by the accordion-folding of a single length of said batting.

12. The filtration panel of claim 1 wherein said granules are entrapped within said batting and, when immersed in water, will have a water content between about 50% to 70%.

\* \* \* \* \*